May 4, 1943.   J. E. BRIGG   2,318,367
INSULATED ELECTRIC CONDUCTOR
Filed July 18, 1939   2 Sheets-Sheet 1

Inventor
John Ellwood Brigg
by Ralph B. Stewart
Attorney

Patented May 4, 1943

2,318,367

UNITED STATES PATENT OFFICE 2,318,367

INSULATED ELECTRIC CONDUCTOR

John Ellwood Brigg, Rickmansworth, England, assignor to Okonite Callender Cable Company Inc., Paterson, N. J., a corporation of New Jersey Application July 18, 1939, Serial No. 285,151
In Great Britain July 19, 1938

14 Claims. (Cl. 174—108)

This invention relates to electrical conductors insulated with laminated dielectric, such as cables or windings used in electrical machinery, but the invention is equally applicable, for example, to the insulation of cable joints and terminal boxes or bushings with laminated insulation. In such cases, the dielectric is formed of layers of fibrous or other insulating material which is often impregnated with oil or compound before or after it is applied to the conductor.

In cables with laminated dielectric, even when the latter is impregnated with oil or compound, the part of the dielectric subjected to electric stress is liable to the formation of small spaces which may contain gas or vapour and which are usually known as voids. These may be formed due to the method of assembling the laminated material, or in the case of impregnated cables they may be due to incomplete impregnation or to subsequent migration of the oil or compound caused by variations in temperature of the cable during operation.

It has been stated already that, although voids in the main body of the dielectric are undesirable, breakdowns in high-voltage cables are most frequently initiated in spaces containing gas at or near to the surface of the conductor, and of which the inner boundary is formed by the conductor and the outer boundary by the dielectric. The process which leads to breakdown is usually started by the bombardment of that part of the dielectric forming the outer boundary of such a space, due to ions liberated from the gas in the space and propelled by the electric force in the space.

A number of proposals have been made to eliminate voids, particularly those close to the conductor. These suggestions either involve expensive apparatus to maintain a pressure greater than atmospheric pressure within the cable, or generally include the formation of a homogeneous layer of dielectric adjacent to the conductor which requires difficult and expensive methods of manufacture. Furthermore, however perfectly such a homogeneous layer of dielectric may be formed in the first instance, it does not prevent the formation of voids either during installation of the cable or during its subsequent working life.

The present invention is based on a different principle, in that it aims at reducing to safe limits the electric stress in both radial and longitudinal gaps adjacent to the conductor by screening instead of attempting to form a cable without voids.

According to the present invention, one or more layers of tape are applied to a cable core or other conductor, around and close to the core or conductor, and this tape includes a conductive layer which is entirely or almost entirely enclosed within the body of the tape. This tape is conveniently formed by metallising one surface of a tape of insulating material and turning under the opposite edges of the tape so that they almost meet along the centre line, whereby the metallised surface is enclosed within the tape except for a narrow gap where the turned-under edges meet. At the same time, a tape may be used in which the conductive layer is a metal strip enclosed in insulation by moulding or otherwise. If such a tape is wound helically directly on to the conductor and the metallic enclosed conductive layers or inserts are connected to the conductor of the cable at more or less frequent intervals, the potential of the conductor is conveyed to the metallic inserts and, in the case of metallised insulation or in the case of a separate metal strip, any voids remaining between the conductor and the metallic inserts are substantially relieved of electric stress and there are no voids outside the metallic insert having a conducting layer as one or other of its boundaries. The invention, however, is more particularly applicable to the screening of the radial and longitudinal gaps which are formed when a tape is lapped flat on the conductor. In such a case, on the top of the flat tape, a tape enclosing metallic inserts, as already described, is lapped to form a second layer, its edges overlapping those of the first layer, and the metallic inserts are maintained at the potential of the conductor so that they are thoroughly screening the radial gaps between successive turns of the first layer and the longitudinal gaps between the first and second layers, and consequently no substantial electric stress remains in those gaps.

Of course, if desired, more than one layer may be employed, either for the first flat tape or the second folded or enclosed tape, and then outside these layers the normal laminated dielectric is applied in the ordinary way. If there is more than one layer of enclosed tape, the metal insert in the inner layer only should be maintained at or about the potential of the conductor, the inserts in the other layers being allowed to float in potential or being maintained at some appropriate potential. It is preferred that the flat tape used next to the conductor shall have its inner surface metallised and that surface held in contact with the conductor when the tape is lapped in position, the conductor having preferably a smooth surface for this purpose.

In order that the invention may be clearly understood and readily carried into effect, some examples of forms of construction of high tension impregnated paper-insulated cable in accordance with the invention will now be described with reference to the accompanying drawings, in which—

It will be appreciated that for the sake of clearness, in Figures 2 to 7, the tapes employed are shown spaced apart in the radial direction and that they are drawn to a scale in a radial direction which is 60 to 70 times the scale in the longitudinal direction.

Figure 1:
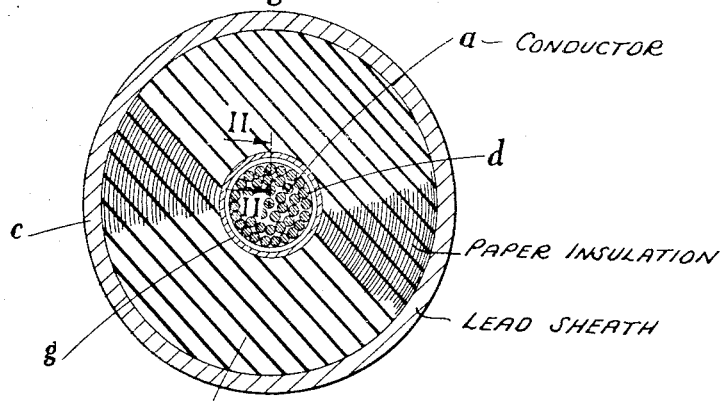
Figure 1 is a transverse section of one form of the improved cable.
Figure 2:
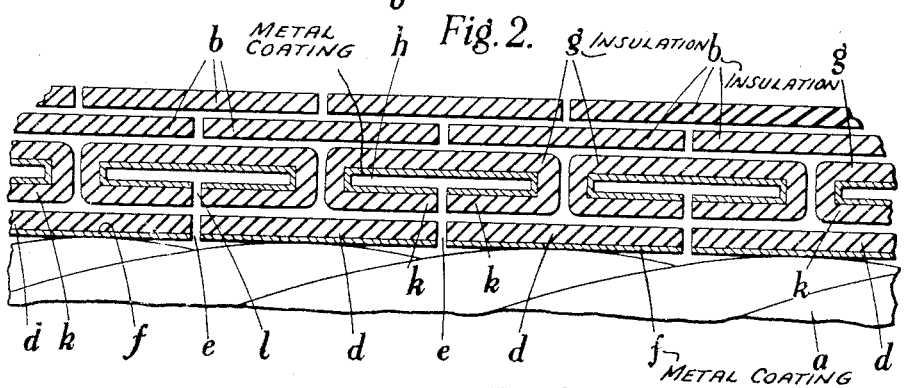
Figure 2 is a fragmental longitudinal section, on a greatly enlarged scale of the cable shown in Figure 1 and taken on the line II—II in that figure.

Referring to Figures 1 and 2, the conductor $a$, which consists of a number of wire strands, is insulated by a thick body of impregnated paper insulation $b$ enclosed within a lead sheath $c$. The conductor $a$ preferably has its surface made smooth.

In Figure 2, one tape $d$ of insulating material is helically lapped around the conductor $a$, it being applied without overlapping and leaving gaps $e$ between adjacent turns of a width, such as is usual in normal cable manufacture. The surface of the tape $d$ next to the conductor $a$ is furnished with a metal covering $f$, for example by a metallising treatment. On top of the initial layer, a further tape $g$ is helically lapped with the same lay to screen the gaps $e$ in the layer $d$ beneath. This further tape $g$ is of the following special construction: It is made of a strip of material of twice the width of the tape $d$ with one of its flat surfaces furnished with a metal coating $h$. The two edges of the tape are turned under as shown at $k$ so as almost to meet as shown substantially along the centre line of the tape $g$ so as to enclose the metal coating $h$, except for the narrow gap $l$ between the meeting portions $k$. The result is, therefore, substantially an insulating tape $g$ with an enclosed flat metal insert $h$. As seen in Figure 2, the folded tape $g$ is then of the same width as the underlying tape $d$ and is arranged to overlap two adjacent turns of the latter, 50:50 so that the middle line of the tape $g$ lies above the gap $e$ between two turns of the tape $d$, and the gap $l$ between the folded edges of the screening tape $g$ is directed towards the conductor $a$ and, therefore, overlies the gap $e$. The main body of normal dielectric $b$ is then applied on top of the screening tape $g$.

The metal layer $h$ in the screening tape $g$ is maintained at, or substantially at, the same potential as the conductor $a$ by connections not shown in the drawings. These connections between the metal layer $h$ and the conductor $a$ may be made at joints in the cable or be provided at every turn, or at suitable intervals, stitches of copper wire connecting the metal coating $h$ with the conductor $a$. This expedient, of course, increases the effective electrical conductivity of the metal coating $h$. The result achieved by this form of construction is that both radial and longitudinal gaps below the screening tape $g$ are substantially relieved of electric stress, and there are no gaps outside the screened area having a conducting layer forming one or more of their boundaries.

If the tape $d$ and the screening tape $g$ are to be made of paper and the screen is to be effective, it is necessary for this, and the constructions described later, to select a paper having good electrical properties. The application of a folded paper to a conductor is liable to cause the inner part of the paper to crease. It is, therefore, advisable to use as thin a paper as possible, such as "condenser tissue" consistent with retaining the required electrical properties. When such a thin paper, however, is used next to a stranded conductor $a$, there is a danger of the main body of insulation $b$ exerting such pressure that the strands will cut through the paper. In order to avoid that risk, the conductor $a$ may be made with a smooth surface as already mentioned or it may be rendered smooth by covering it with copper tapes or by enclosing it in a copper screen as described in the specification of British Patent No. 454,449.

In order to avoid the formation of voids outside the screened area having a conducting layer forming one or more of the boundaries, the metal $h$ forming the screen should be in intimate contact with the enclosing insulating material of the tape $g$ such as is the case when the paper is metallised if the invention is to be carried out quite effectively.

Figure 3:
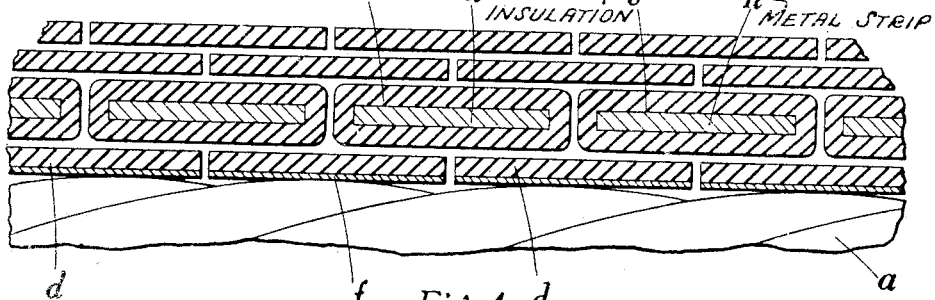
Figures 3 to 6 are sectional views similar to Figure 2 of four modified forms of construction.

However, an approximation to the best results may be obtained if the screening element consists of a metal strip $h'$ coated or sheathed with insulating material $g$ as shown in Figure 3. In that construction, the first tape $d$ with its metal coating $f$ is laid around the conductor $a$ and is overlaid with the coated strip $h'$. In all other respects, the cable is made as in Figures 1 and 2.

Figure 4:
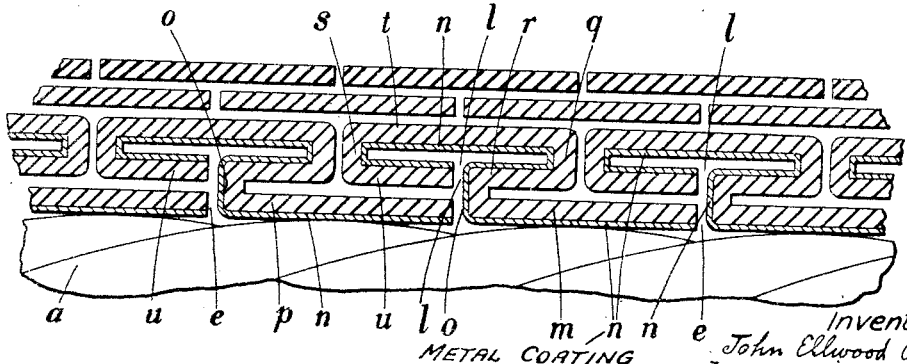

In another form of construction illustrated in Figure 4, a single strip $m$ of thin, good quality, paper is folded so that when lapped on the conductor $a$, it serves the purpose of both the first and second layers in Figure 2. The strip $m$ is three times the width of the strip required for each layer and has a metal coating $n$ on its inner surface. The strip is folded at $o$ so that a portion $p$ of one third the total width, has the metal coating $n$ exposed. It is folded back at $q$ leaving a portion $r$ of half the width of the portion $p$. The strip is again folded under at $s$ so that the portion $t$ is of the same width as the portion $p$ and so that the final edge portion $u$ has its free edge substantially meeting the folded edge at $o$. Then the metallised surface $n$ of the parts $r$ and $u$ is substantially in contact with that of the part $t$. The resultant folded strip is lapped around the conductor $a$ in helical fashion so that when one turn has been laid in position, the portion $u$ of the next turn laps over and beds on the upper surface of one half of the portion $p$ of the preceding turn. Thus, in the case of the arrangement shown in Figure 4 there is, for the most part (i. e., except at the places where the narrow gaps such as $e$ occur), a total thickness of metallised strip which is three times as thick as the initial unfolded strip. The metallised surface $n$ of the portion $p$ is in contact with the conductor $a$ and the metallised surface of the portions $r$, $t$ and $u$ are enclosed within the tape as in Figure 2, to which the arrangement is equivalent electrically except that the enclosed metallised surface is electrically connected to the metallised surface n in contact with the conductor a by the short length of metallised surface at the fold o. Thus the enclosed metallised surface is maintained at the potential of the conductor a without the need of any further provision. The shielding is the same as in Figure 2, since each gap l between turns in the first layer is exactly radially in line with the gap l between the meeting edges of the portions u and r.

Figure 5:
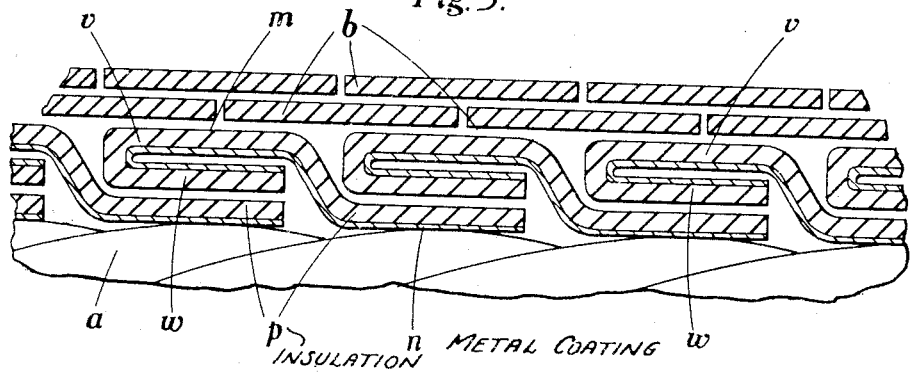

In Figure 5, in order to facilitate the application of the tape m to the conductor a, it is folded in somewhat different fashion. The tape m has a portion p with its metal coating n in contact with the conductor a. The tape is, however, folded up and away to give a second portion v of equal width while the remaining one third of the width is folded under to form the portion w, the metal coating n again being enclosed between the parts v and w. After one turn has been laid, the double thickness formed by the portions v, w of the next turn is laid on the portion p of the preceding turn. The tape, when the lapping is completed, is equivalent in its effect to that shown in Figure 4.

Figure 6:
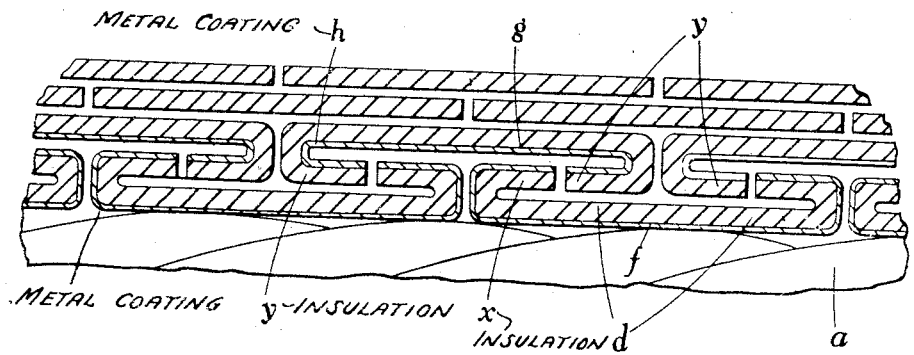

The form of construction shown in Figure 6 is a slight modification of that illustrated in Figure 2. In Figure 6 the tape d is folded up at each edge for one quarter of its width to form the portions x, the metal coating of the part d being in contact with the conductor a, but that of the portions x being outward. The tape g is similar to the tape d except that its portions y are turned over partially to enclose the metal coating h. When the tapes are lapped as shown in the drawing, the shielding metal consisting of the coating h of the tape g and the coating f of the portions x is enclosed by the parts g, y and x. Thus, this form of construction may be regarded as a modification of that shown in Figure 2 arranged for the coating f to be extended so as to connect the coating h direct to the conductor a.

Figure 7:
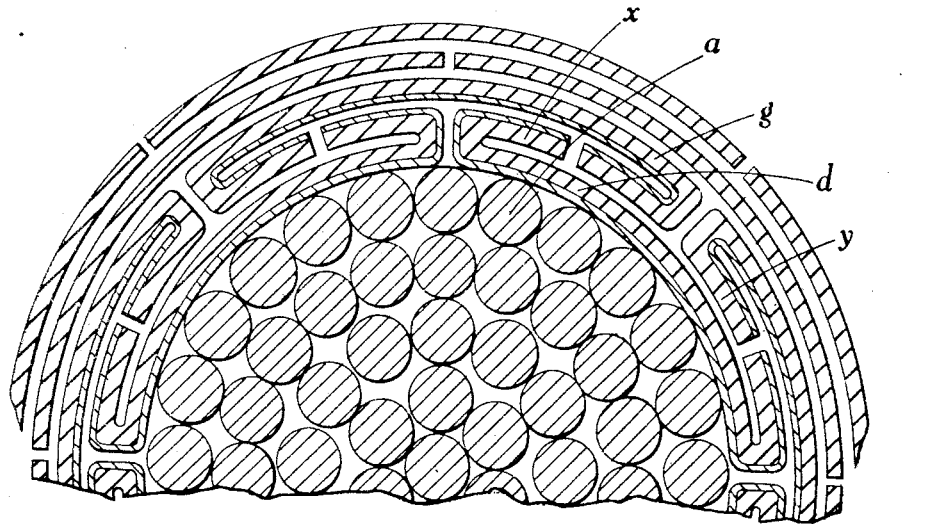
Figure 7 is a transverse section of yet a further modification of the cable shown in Figures 1 and 2.

Any of the forms of tape shown and described could be laid on to the conductor a longitudinally or with a very long lay instead of with the short lay assumed in Figures 2 to 6 of the drawings. In Figure 7, a cross-section of a cable is shown, in which two tapes folded as in Figure 6 are applied to the conductor a longitudinally. Corresponding reference letters have been used in Figures 6 and 7.

As already indicated, the invention is not limited to one tape in either the first or screening layer and, although it is advisable, it is not absolutely essential for the first tape to be metallised. The invention is not limited to any particular material for the dielectric or to the number of materials used in any one cable. The first layer and the screening layer should preferably be of a homogeneous material but they may differ from each other and from the main body of the dielectric.

The screening provided, according to the present invention, may permit an appreciably higher stress to be used in the dielectric and this may be carried to such a point that the effect, which was previously confined to the conductor, is also made evident at the sheath. In such conditions, steps analogous to those already set out above may be applied, in accordance with the present invention, to the gaps in the dielectric adjacent the sheath.

I claim:
1. An electric cable comprising a conductor, a screen applied to said conductor, said screen being formed of a tape consisting of a metallic strip having insulating material in intimate contact with the entire outer surface of said metallic strip and extending around at least one edge thereof and covering at least a portion of the inner surface thereof, said tape being applied to said conductor so that no part of said metallic strip is exposed on the outer surface of said screen.

2. An electric cable according to claim 1 wherein said metallic strip is connected to said conductor.

3. An electric cable according to claim 1 and including laminated insulation surrounding said screen, and a metallic sheath surrounding said laminated insulation.

4. An insulated electric conductor, comprising a conductor proper, a tape of insulating material lapped to form a first layer on said conductor and a second tape of insulating material containing a metallic insert lapped to form a second layer on said first-mentioned tape with its edges overlapping those of said first-mentioned tape so that when said metallic insert is maintained at, or substantially at, the potential of said conductor, said insert screens the radial and longitudinal gaps which may exist between adjacent laps of said first-mentioned tape, said second tape having insulating material covering the entire outer surface of said metallic insert and extending around the edges thereof and covering at least a portion of the inner surface of said insert.

5. An insulated electric conductor, comprising a conductor proper, a tape of insulating material lapped to form a first layer on said conductor and a second tape of insulating material containing a metallic insert lapped to form a second layer on said first-mentioned tape with its edges overlapping those of said first-mentioned tape, said metallic insert being electrically connected to said conductor, said second tape having insulating material covering the entire outer surface of said metallic insert and extending around the edges thereof and covering at least a portion of the inner surface of said insert.

6. An insulated electric conductor, comprising a conductor proper and a tape consisting of thin insulating material furnished with a closely adherent metal coating on one of its surfaces and folded transversely thereof so as to enclose at least substantially said metal coating, said tape being located around said conductor so that said metal coating forms a screen around said conductor.

7. An insulated electric conductor, comprising a conductor proper, a tape of insulating material furnished with a metal coating on one of its surfaces and lapped on said conductor with its metal coating in contact with said conductor, and a second tape of insulating material containing a metallic insert lapped to form a second layer on said first-mentioned tape with its edges overlapping those of said first-mentioned tape so that when said metallic insert is maintained at, or substantially at, the potential of said conductor, said insert screens the radial and longitudinal gaps formed by said first-mentioned tape, said second tape having insulating material covering the entire outer surface of said metallic insert and extending around the edges thereof and covering at least a portion of the inner surface of said insert.

8. An insulated electric conductor, comprising a conductor proper, a tape of insulating material furnished with a metal coating on one of its surfaces and lapped on said conductor with its metal coating in contact with said conductor, and a tape consisting of thin insulating material furnished with a metal coating on one of its surfaces and folded so as to enclose at least substantially said metal coating, said tape being located around said conductor so that said metal coating forms a screen around said conductor.

9. An insulated electric conductor, comprising a conductor proper, a tape of good quality paper furnished with a metal coating on one of its surfaces and lapped on said conductor with its metal coating in contact with said conductor, and a tape consisting of thin, good quality paper furnished with a metal coating on one of its surfaces and folded so as to enclose at least substantially said metal coating, said tape being located around said conductor so that said metal coating forms a screen around said conductor.

10. An electric cable comprising a conductor, a tape of insulating material lapped to form a first layer on said conductor, a second tape of insulating material containing a metallic insert lapped to form a second layer on said first-mentioned tape with its edges overlapping those of said first-mentioned tape so that when said metallic insert is maintained at, or substantially at, the potential of said conductor, said insert screens the radial and longitudinal gaps formed by said first-mentioned tape and laminated insulation surrounding said second-mentioned tape and formed without any voids having a boundary formed by conducting material, said second tape having insulating material covering the entire outer surface of said metallic insert and extending around the edges thereof and covering at least a portion of the inner surface of said insert.

11. An insulated electric conductor, comprising a conductor proper and a thin tape of insulating material furnished with a metal coating on one of its surfaces, said tape being folded along longitudinal lines to expose said metal coating for part of its width and substantially to enclose said coating for another part of its width, said tape being lapped on said conductor with the exposed part of the metal coating in contact with said conductor.

12. An insulated electric conductor, comprising a conductor proper and a thin tape of insulating material furnished with a metal coating on one of its surfaces, said tape being folded along longitudinal lines to expose said metal coating for approximately one-third of its width to yield a projecting edge of single thickness and substantially to enclose said coating for most of the remainder of its width to yield an oppositely projecting portion of double thickness, said tape being lapped on said conductor with the exposed part of the metal coating in contact with said conductor and with the projecting portions of double thickness of a convolution each resting on the projecting edge of single thickness of the preceding convolution.

13. An insulated electric conductor, comprising a conductor proper and a thin tape of insulating material furnished with a metal coating on one of its surfaces, said tape being folded along longitudinal lines to expose said metal coating for approximately one-third of its width to yield a projecting edge of single thickness and of approximately one-sixth of the width of said tape and substantially to enclose said coating for most of the remainder of its width to yield an oppositely projecting portion of double thickness and of approximately one-sixth of the width of said tape and an intermediate portion of treble thickness and of approximately one-sixth of the width of said tape, said tape then being lapped on to said conductor with the exposed part of the metal coating in contact with said conductor and with the projecting portion of double thickness of a convolution resting on the projecting edge of single thickness of the preceding convolution.

14. An insulated electric conductor, comprising a conductor proper and a thin tape of insulating material furnished with a metal coating on one of its surfaces, said tape being folded along longitudinal lines to expose said metal coating for approximately one-third of its width to yield a projecting edge of single thickness and of approximately one-third of the width of said tape and substantially to enclose said coating for most of the remainder of its width to yield an oppositely projecting portion of double thickness and of approximately one-third of the width of said tape, said tape being lapped on said conductor with the exposed part of the metal coating in contact with said conductor and with the projecting portion of double thickness of a convolution resting on the projecting edge of single thickness of the preceding convolution.

JOHN ELLWOOD BRIGG.